Aug. 16, 1949.  W. UMBDENSTOCK  2,479,281
GRINDING MACHINE
Filed Jan. 17, 1946　　8 Sheets-Sheet 4
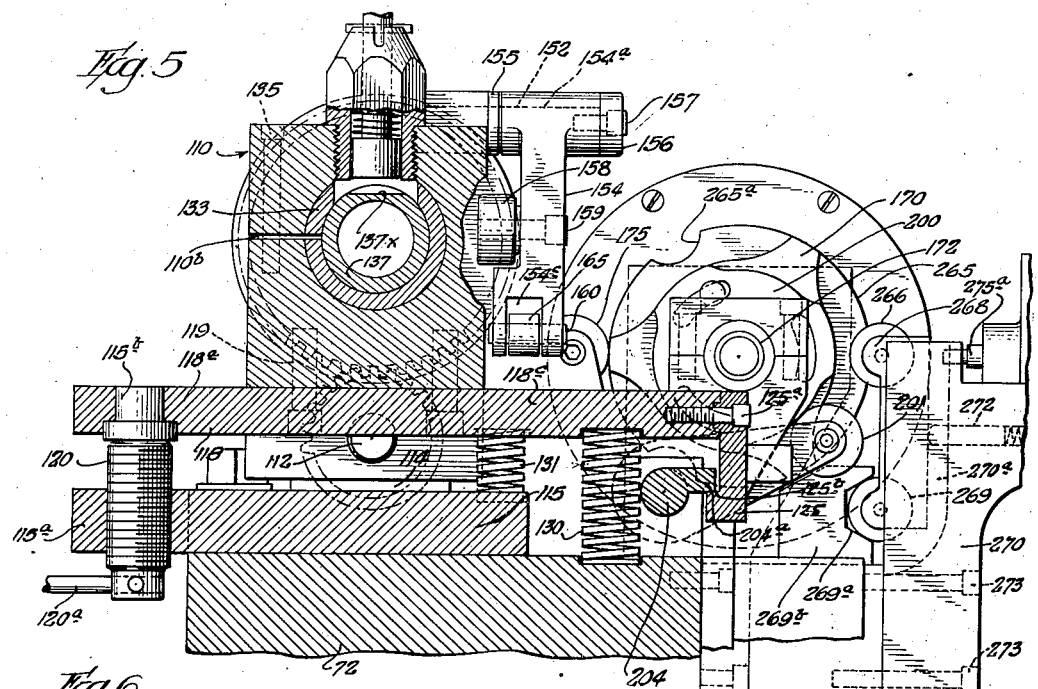
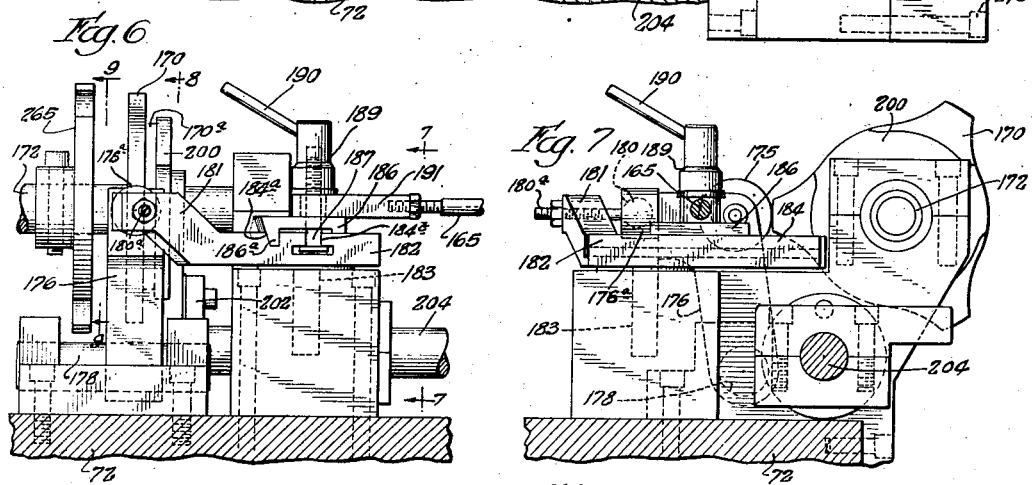
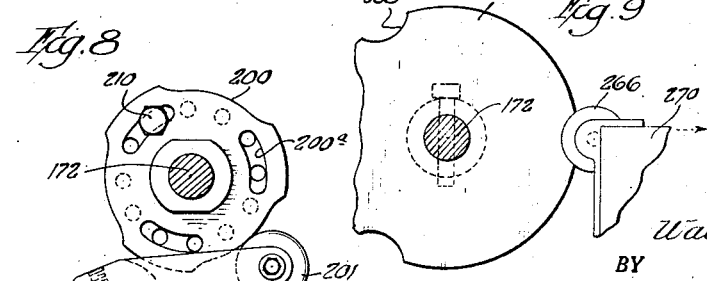
INVENTOR.
Walter Umbdenstock
BY
Sheridan, Davis & Cogill
Attys.

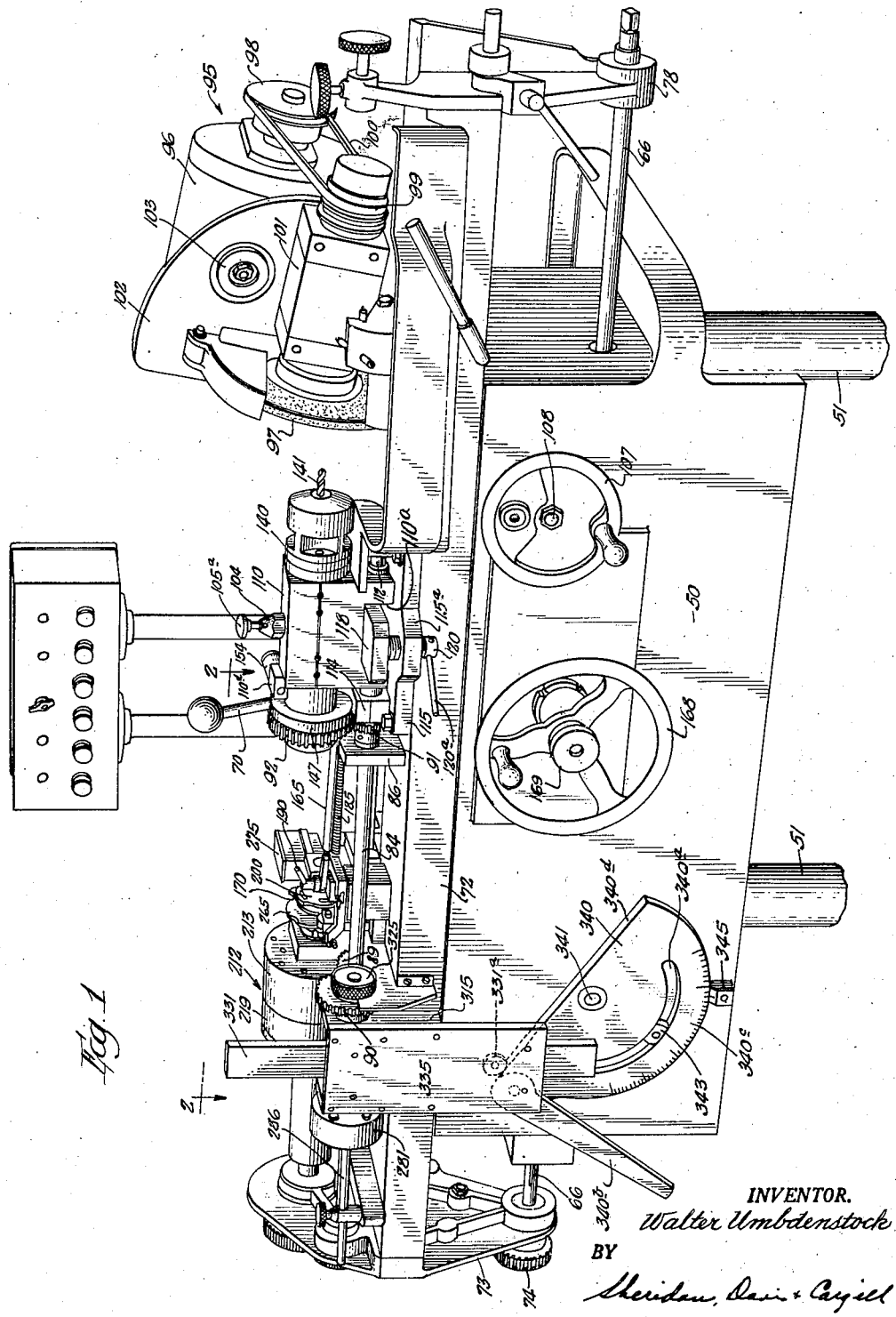

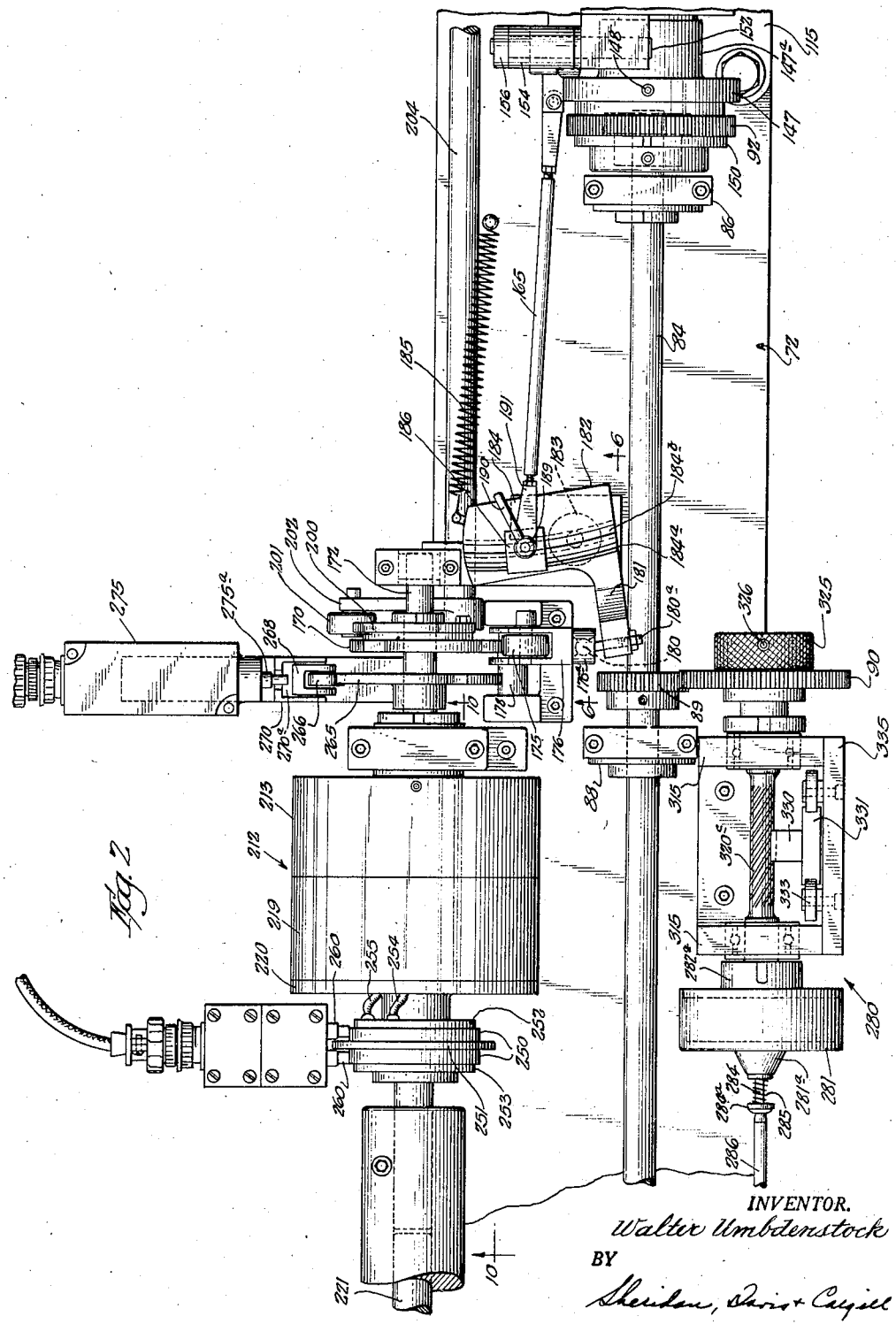

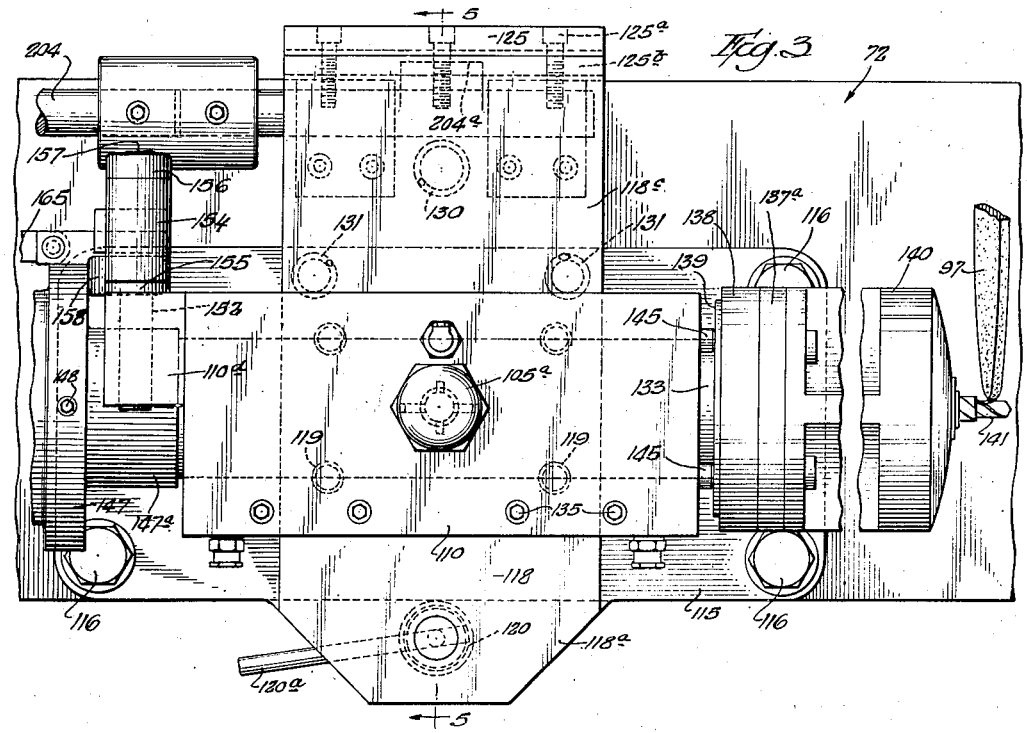
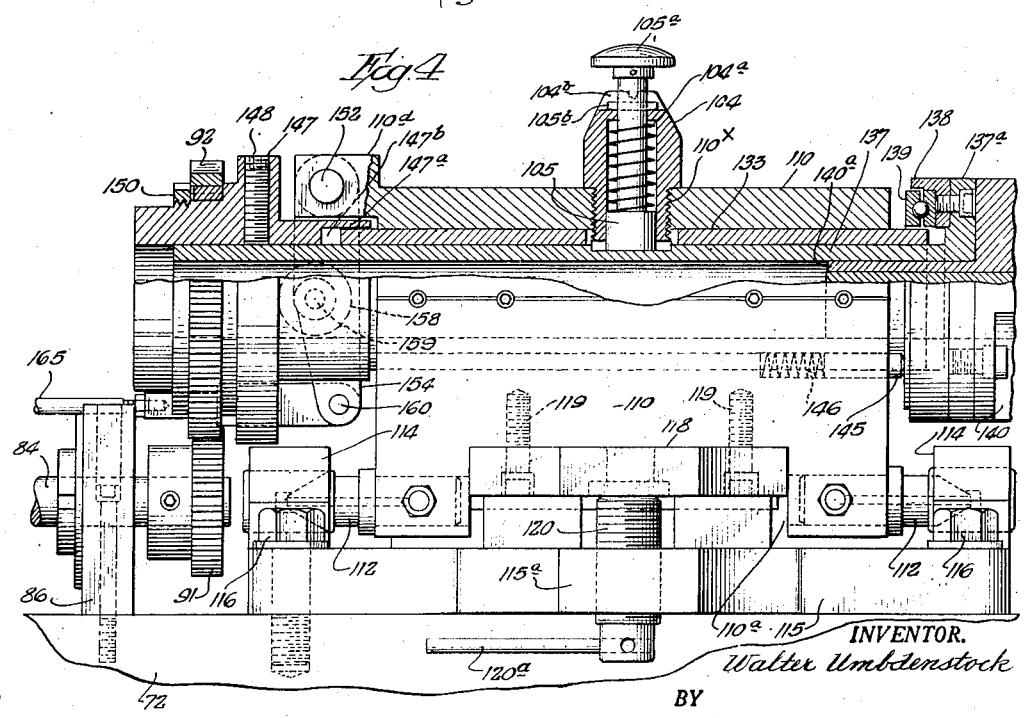

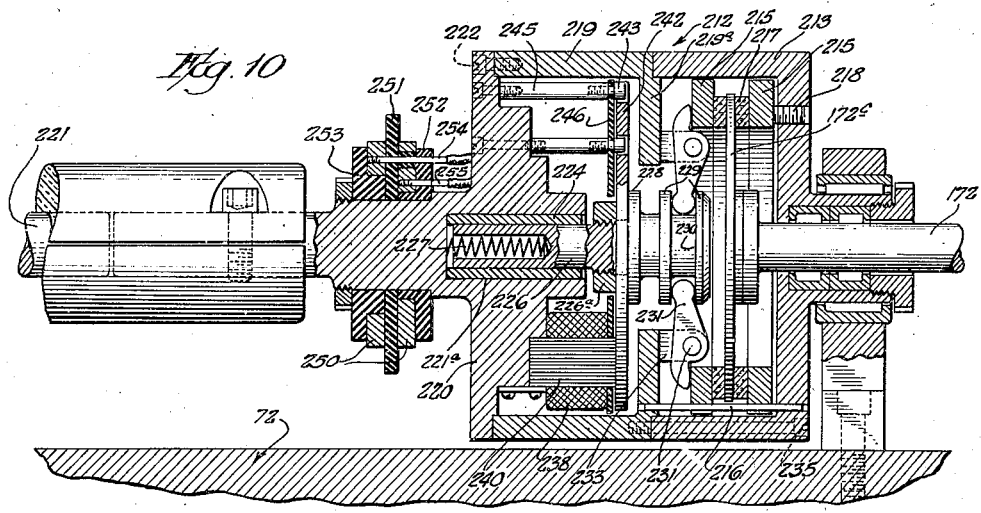
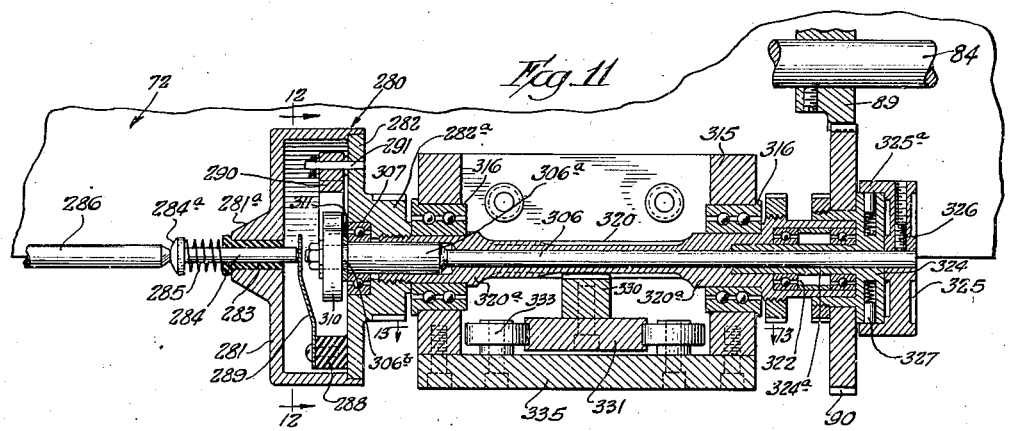
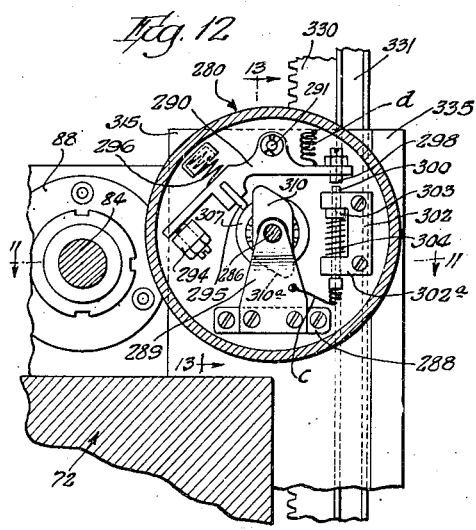
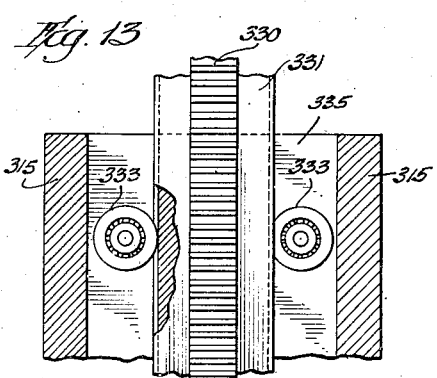
INVENTOR.
Walter Umbdenstock
BY
Sheridan, Ross & Cargill
Attys.

Aug. 16, 1949.                W. UMBDENSTOCK                2,479,281
                               GRINDING MACHINE
Filed Jan. 17, 1946                                   8 Sheets-Sheet 6
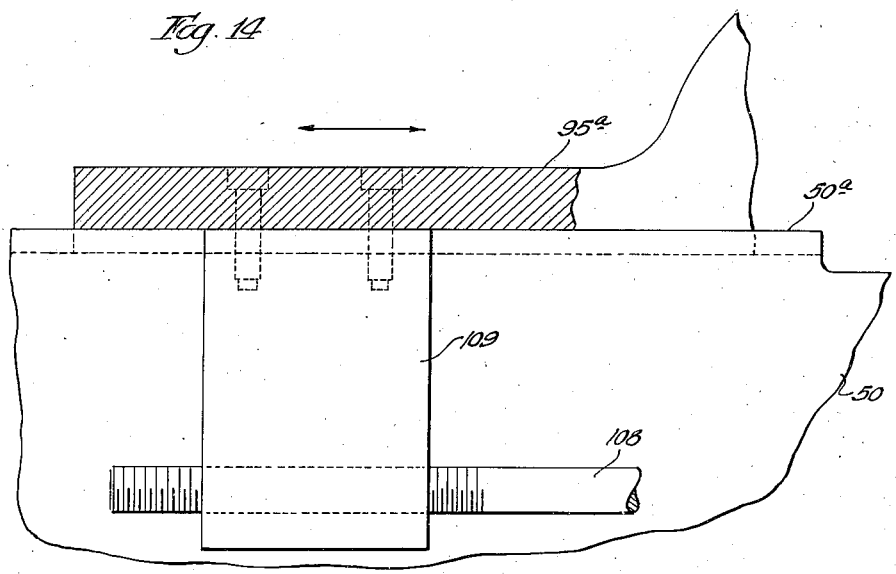
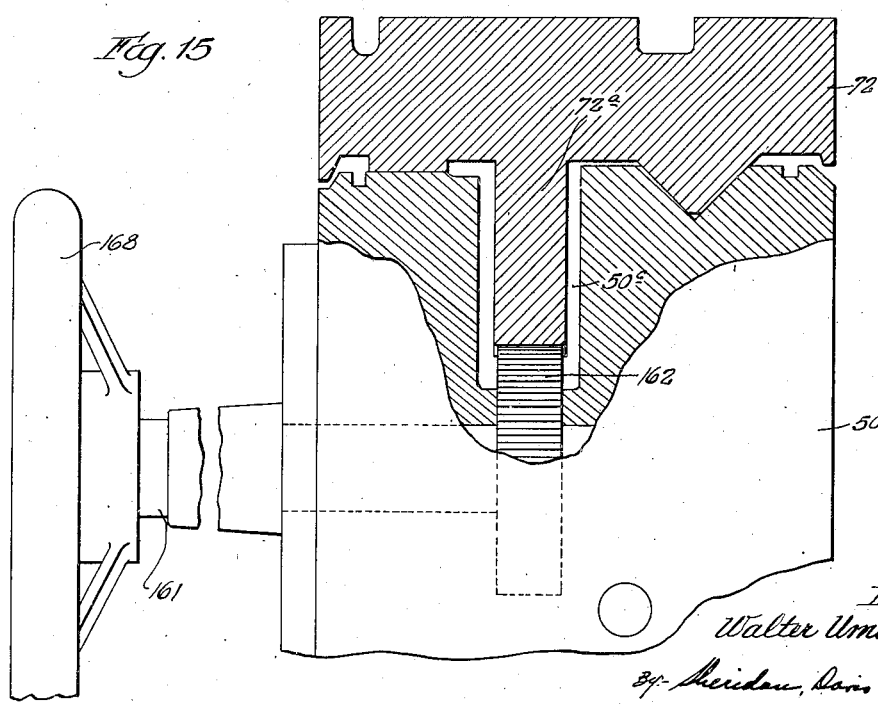

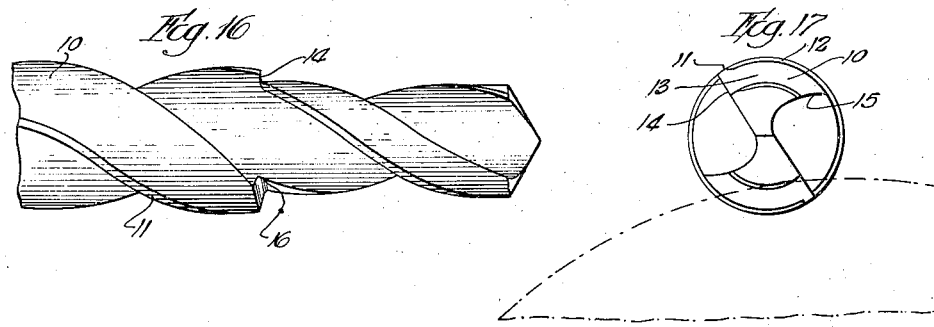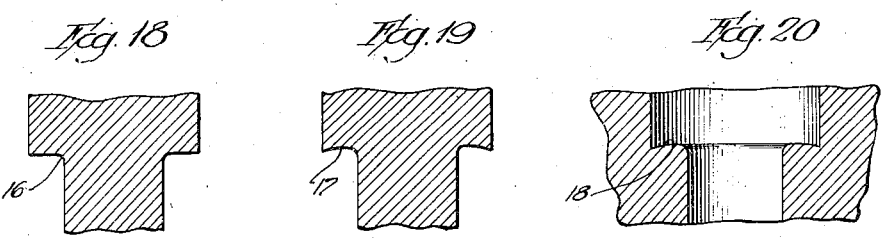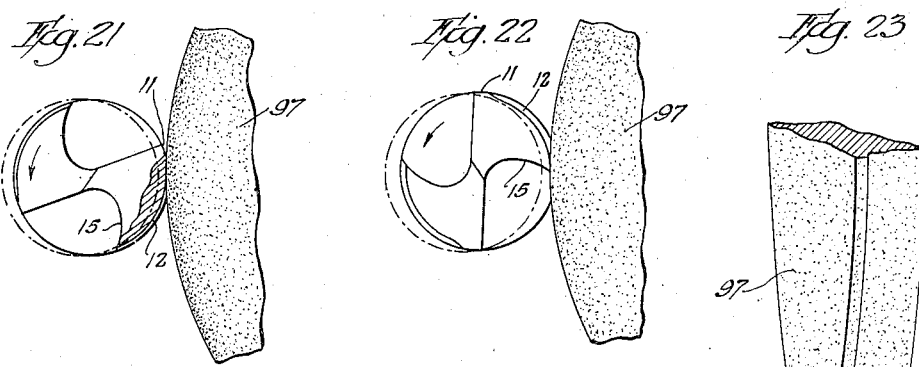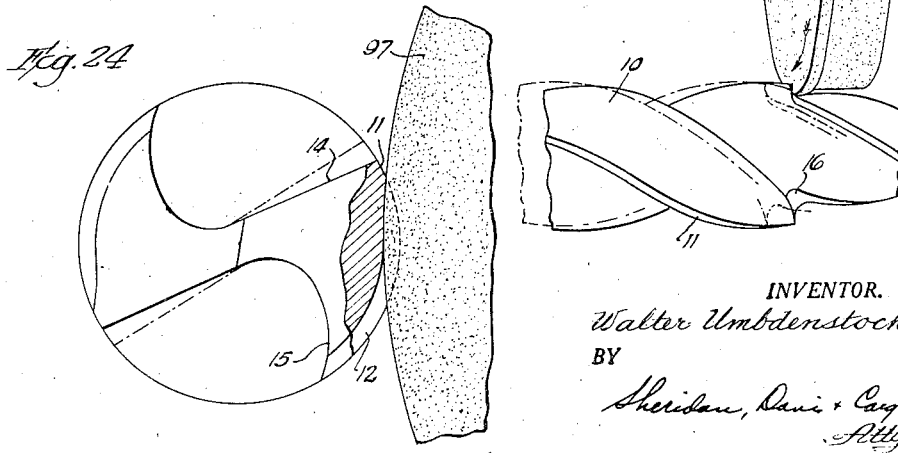

Aug. 16, 1949.  W. UMBDENSTOCK  2,479,281
GRINDING MACHINE
Filed Jan. 17, 1946  8 Sheets-Sheet 8

INVENTOR.
Walter Umbdenstock
BY
Sheridan, Davis & Cargill
Attys.

Patented Aug. 16, 1949

2,479,281

UNITED STATES PATENT OFFICE 2,479,281

GRINDING MACHINE

Walter Umbdenstock, Chicago, Ill., assignor to Lion Manufacturing Corporation, Chicago, Ill., a corporation of Illinois Application January 17, 1946, Serial No. 641,790

17 Claims. (Cl. 51—219)

The invention relates to improvements in grinding machines, and particularly in machines for grinding so-called stepped drills.

An object of the invention is to provide such a machine having a work head mounted for rocking movement toward and from a grinding wheel, the chuck for carrying the drill or work piece being also constructed for reciprocating movement axially of the work piece and in timed relation with the rotation of such work piece.

Another object is to provide a machine of the character described which may be operated to grind raised flutes of a drill or the like with lands at and along the cutting edge and relieved surfaces between such lands and the trailing edges of the flutes.

Another object is to provide a machine of the character described which may be operated to grind the shoulders between stepped portions with helical relief from the radial cutting edges to the trailing edges thereof.

Another object consists in the provision of cam-actuated means to effect the rocking and reciprocating motions of the work head and chuck in proper timed relations.

Another object consists in the provision of magnetically controlled clutch means for intermittently effecting actuation of such cam means.

Another object consists in the provision of timing means operating automatically to actuate said magnetic clutch means.

Another object consists in the provision of an automatic adjusting means to advance or retard the timing of the grinding operation to compensate for helically formed grooves and flutes upon a drill or the like.

Another object is to provide means which will automatically maintain the proper synchronism and coordination between the means for effecting the rocking and reciprocating movement of the work head after stopping of the same.

Other objects will be set forth and made apparent in the following specification and drawings including various details of construction and arrangement of parts.

In the drawings:

Fig. 1 is a front view in perspective of a machine embodying my invention.

Fig. 2 is a plan view, drawn to an enlarged scale, of a portion of the mechanism viewed from the plane of line 2—2 of Fig. 1.

Fig. 3 is a plan view similar to Fig. 2 of the work head and associated parts.

Fig. 4 is a front elevation of the mechanism illustrated in Fig. 3, portions thereof being broken away for a better understanding.

Fig. 5 is a vertical section taken along line 5—5 of Fig. 3.

Fig. 6 is a side front elevation of a portion of the mechanism as viewed along the irregular lines 6—6 of Fig. 2.

Fig. 7 is a vertical section taken along the lines 7—7 of Fig. 6.

Fig. 8 is a vertical section taken along the lines 8—8 of Fig. 6.

Fig. 9 is a vertical section taken along the lines 9—9 of Fig. 6.

Fig. 10 is a vertical section through the magnetic clutch taken along the irregular lines 10—10 of Fig. 2.

Fig. 11 is a horizontal section taken on irregular lines 11—11 of Fig. 12.

Fig. 12 is a vertical section taken on lines 12—12 of Fig. 11.

Fig. 13 is a vertical section taken on lines 13—13 of Fig. 12.

Fig. 14 is a vertical transverse section portion of the mechanism drawn to an enlarged scale showing the adjustable mounting of the grinder head for transverse movement upon the table.

Fig. 15 is a similar view partially in section illustrating the mounting of the carriage and means for effecting longitudinal movement thereof upon the table.

Fig. 16 is a side elevation of a portion of a stepped drill as ground by my machine.

Fig. 17 is an end view of the same, a portion of the grinding wheel being indicated in broken lines in the position to initiate relief grinding of one of the drill flutes.

Fig. 18 is a vertical section through a portion of the stepped drill at the juncture of two steps illustrating the filleted angle of juncture.

Fig. 19 is a similar section illustrating a portion of a drill in which the shoulder between the two drill steps is concavely ground.

Fig. 20 is a similar section of a portion of a stepped drill hole resulting from use of the type of step drill illustrated in Fig. 17.

Fig. 21 is an end view of a drill blank, a portion thereof being illustrated in section, and showing a portion of the grinding wheel in position at the start of a relief grinding operation. The broken line illustrates the opposite limit of travel of the drill relative to the grinder during the rocking of the work head.

Fig. 22 is a view similar to Fig. 19 illustrating the relative position of the drill and grinding wheel at the completion of a relief grinding operation.

Fig. 23 is a side elevation of a portion of the step drill and showing a portion of the grinding wheel in position for grinding the shoulder at the juncture of two stepped portions of the drill.

Fig. 24 is an enlarged end elevation of a drill blank and portion of the grinder wheel in position for relief grinding, one broken line indicating the completed relief cut and the nearly radial broken lines indicating various points for the initiation of the land formation cutting edge of a drill flute where the flutes and grooves are of helical construction.

Like numerals refer to like elements throughout the drawings in which 50 designates a supporting base or table mounted upon legs 51 and provided with a floor supported platform 53 upon which is mounted and secured a driving motor M.

Figure 25:
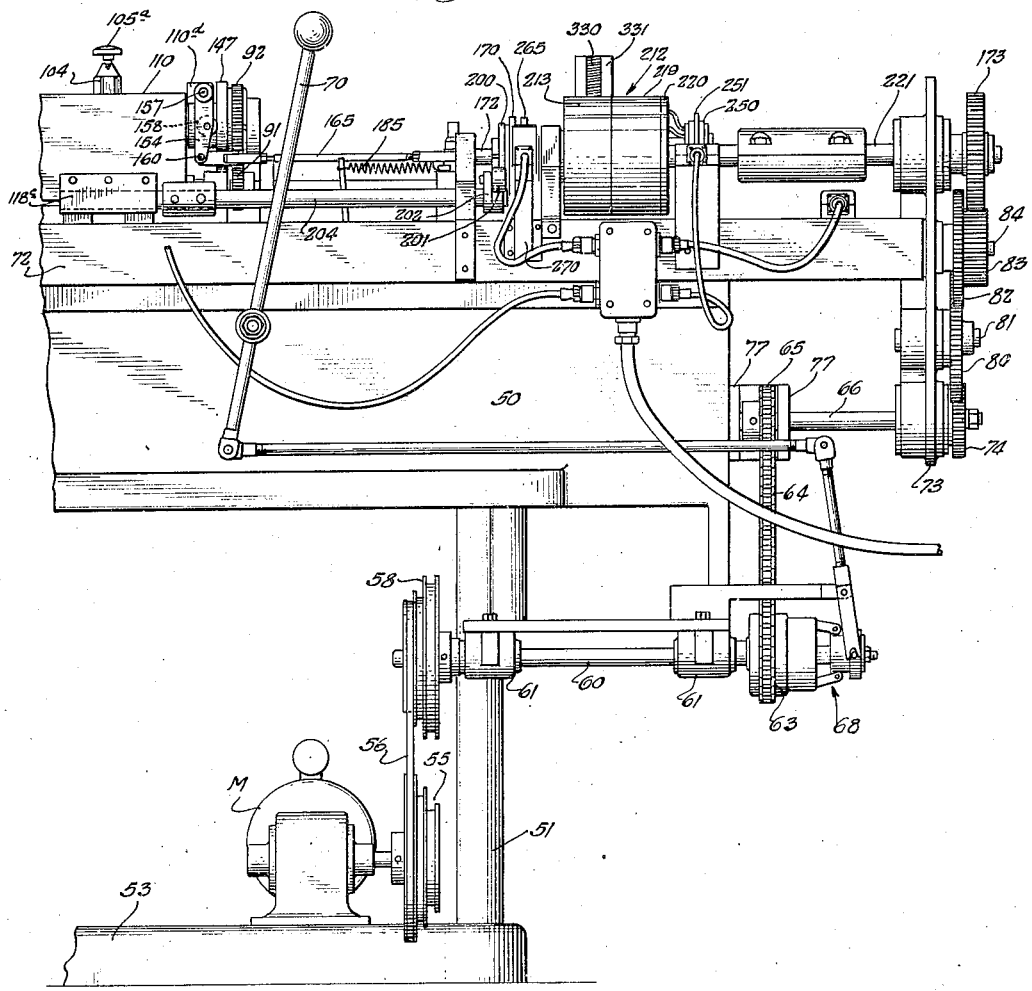
Fig. 25 is a rear elevation of a portion of the machine.

This motor transmits rotation to and through the step pulley 55 by a belt 56 to a second step driven pulley 58 carried by the main drive shaft 60 journalled in suitable bearings 61 carried by the table 50. A driving sprocket 63 is carried at the outer end of the shaft 60 and, through chain 64, transmits rotation to a second sprocket 65 secured to a counter-shaft 66. A clutch generally indicated by numeral 68 is operatively associated with the sprocket 63 and operable by the handle 70 through suitable rods and levers to place the sprocket 63 into and out of operative engagement with the shaft 60 and thereby to effect rotation or discontinue rotation of the driving gears and the machine generally. These gears (see Fig. 25) are mounted at one end of the carriage 72 slidably mounted upon the base 50, being provided with shafts journalled in suitable bearings carried by an end plate 73 (Figs. 1, 2, 3). The lowermost gear 74 of the train is carried upon shaft 66 which is also journalled in the bracket bearings 77 carried by the end of the base 50, the shaft being extended through the base and journalled at its opposite end in a bracket bearing 78. The shaft 66 is splined from its bearing support in plate 73 to its opposite end for movement relative to gearing carried by it in movement of the carriage 72 and it functions to feed the carriage, automatically or manually, longitudinally of the base 50 and to permit movement of gear 74 which is splined to the shaft 66. The second gear 80 meshes with gear 74 and is rotated thereby, being mounted upon the stub shaft 81 and, in turn, meshing with the gear 82 with which is integrated the pinion 83 on the shaft 84. The shaft 84 as indicated above is journalled near one end in the end plate 73 and is extended over the carriage 72 for bearing support in the post or brackets 86 (Fig. 1). Intermediate its extremities, shaft 84 is journalled in another bearing 88 and at one side thereof is provided with a pinion 89 meshing with the gear 90. One end of the shaft 84 is provided with a second pinion 91 meshing with the gear 92 (Figs. 1, 2). The grinding mechanism, generally indicated by numeral 95, is mounted upon the plate 95a (Fig. 14) for transverse or lateral adjustment upon the base 50 and includes a driving motor 96 and a disc like grinder 97, rotatable thereby through pulleys 98, 99 and the belt 100. The bearing block 101 carries the grinder and its driving shaft is in turn carried by the plate 102 which may be rotatably adjusted upon the assembly by release of the nut 103 to vary the inclination of the grinding wheel 97. Transverse movement of the grinding assembly 95 is effected by means of the hand wheel 107 and the shaft 108 at the front of the table 50, the latter being threadedly engaged with the block 109 carried by the plate 95a which is shouldered to ride upon guide ribs 50a of the table 50, which latter is provided with an opening at the top to permit movement of the block 109.

The work head 110 is mounted for rocking movement upon the carriage, being provided with a pivot 112 at each end, these pivots being located at near the bottom of the work head 110 and coaxial with the axis or rocking movement of the head (Fig. 4). These pivots are journalled in bearing blocks 114 which are in turn carried by the supporting plate 115 which is secured as by cap screws 116, to the upper surface of the carriage 72. Projecting from one side of the head 110 is a plate 118 secured in a recess 110a in the bottom of the head 110 by screws 119. Threadedly engaging the projection 115a of the plate 115 and projecting upwardly therethrough, is a stop screw 120 having a projecting handle 120a whereby it may be rotated and, due to its threaded engagement, raised and lowered to limit the rocking movement of the head 110. An anvil pin 115b is carried by the projecting portion 118a of the plate 118 over stop pin 120, the upper end of which is in contact at one limit of rocking movement of the work head (Fig. 5).

The plate 118 projects laterally beyond the other side of the work head 110 as indicated by numeral 118c (Figs. 3, 4, 5), and is provided at its outer edge with a depending shouldered plate 125 secured as by screws 125a to the plate 118 at its outer edge. The plate 125 is provided with an inwardly projecting shoulder 125b at its lower edge (Figs. 3, 5). Secured to the carriage 72 and projecting upwardly therefrom is the coil spring 130 seating at its upper end in a suitable recess the bottom of the plate 118 (Fig. 5).

Coacting with the coil spring 130 are a pair of supplementary coil springs 131 extending between the plate 115 and the plate 118, suitable recesses being provided in such plates to position and seat said springs, which, as will be apparent, normally act to urge the work head 110 at its pivots 112 to the position illustrated in Fig. 5 of the anvil pin 115b in contact with the stop screw 120. Movement of the work head to this position will move the work piece carried thereby in a direction away from the grinding wheel 97.

The work head 110 is longitudinaly bored (Figs. 3, 4, 5), to accommodate a bearing sleeve 133 fixed therein and projecting from the ends of the work head. The latter, in the embodiment shown, is provided with a transverse slot 110b at one side between that side and the central bore. Screws 135 threadedly engage a work head 110 above and below the cut 110a and may be adjusted to securely grip the bearing sleeve 133 in its bore. Journalled in the sleeve 133 is a chuck-carrying sleeve 137 projecting beyond the ends of the bearing sleeve as indicated in Fig. 4, for example. At one projecting end the sleeve 137 is provided with a flange 137a to which is secured, by screws or otherwise, a collar 138 carrying the bearing member 139. Also secured to the flange 137a is a chuck generally indicated by numeral 140 provided with any suitable means for gripping and holding a work piece 141 as, for example, a drill blank. This chuck is provided with a rearwardly extending flange 140a seating in the sleeve 137 (Fig. 4). Housed in recesses in one end of the head 110 are the spring urged pins 145 normally projected from their recesses by the coiled springs 146. The ends of these pins 145 bear against a face of the bearing 139 and urge the chuck 140 on sleeve 137 outwardly to the right as viewed in Fig. 4. The work head 110 is provided with a threaded aperture 110x in the top central portion thereof (Fig. 4) in which is threaded a casing 104 centrally bored and shouldered to house a coil spring 104a and provided with a plunger 105 having a projecting knob 105a and a cross pin 105b, seatable in a transverse slot 104b on top of the casing 104 when in one position. When the plunger is in the position illustrated in Fig. 4, the pin will seat in the slot 104b and the spring 104a will maintain it in contact with a flattened surface 137x on the sleeve 137. This automatically positions the chuck when it is desired to insert a drill or blank for grinding in proper relation to the members which control the grinding movements of the work piece. During operation the plunger is lifted from such position and rotated with the pin 105b resting upon the top of the casing 104 (Fig. 5), in which position there is not interference with the rotation of the sleeve 137.

At the opposite end of sleeve 137 is secured the collar 147 as by set screws 148, this collar carrying the gear 92 secured thereto as by threaded nut 150. Collar 147 is provided with an extended flange 147a at the other side and such flange being recessed at 147b to clear and surround the adjacent end of the sleeve 133, sufficient clearance being axially provided to permit relative shift of the sleeve 137 in the bearing sleeve 133. A similar clearance is provided at the opposite end as illustrated in Fig. 4.

A lug 110d is formed on the top and at one end of the work head 110, being apertured to accommodate the pin 152 (Figs. 3, 4, 5). Journalled upon the projecting portion of the pin 152 is an apertured shoulder 154a or rocker arm 154, the same being held in journalled position by the spacing ring 155 at one side of the shoulder, and a cap 156 at the other end secured to the pin 152 by the screw 157 (Fig. 5). Intermediate its extremities, the rocker arm 154 carries a roller 158 above the pin 159. This roller lies behind the collar 147 (Figs. 3, 4), and is adapted to bear thereagainst under the actuation of the rod 165 to shift the sleeve 137 and chuck 140 against the action of the pins 145 to the left, as viewed in Fig. 4, for example. At the lower end of the arm 154 is a cross pin 160 extending through the recess 154c in the lower end of the arm 154. Journalled upon this pin 160 is an apertured end of the rod 165 (Figs. 1, 3, 4, 5, 6).

The carriage 72 and with it the supported elements of the mechanism including the work head 110 are movable longitudinally by actuation of conventional lathe-type feed means including the manually operable handle 168, shaft 161 in pinion 162 and rack 72a mounted at the bottom of the carriage 72 in a way 50c formed in the base 50. Suitable guiding means is provided to prevent lateral displacement of the carriage 72 and to insure accurate longitudinal movement thereof upon the base 50. The same conventional mechanism is availed of for automatic longitudinal feed of the carriage, if so desired, by actuation of the knob 169.

To reciprocate the rod 165 for reciprocation of the chuck and work piece by means of the rocker arm 154, I provide a cam 170 (Figs. 2, 5, 6), mounted upon and secured to the shaft 172 (Figs. 2, 10). Coacting with the cam 170 is the follower 175 comprising a roller pivotally mounted at the upper end of a rocking arm 176 (Figs. 2 and 7), journalled on a pin 178 and provided with a projecting lug 176a having a socket therein within which is mounted the ball 180, having a screw threaded stem 180a, carried by an arm 181 or bell crank 182 pivotally attached to the stud 183 (Fig. 2). The bell crank 182 is provided with the angularly disposed table portion 184 having arcuate grooves 184a, 185b in the upper surface thereof. A spring 185 is attached at one end to the bed 72 and at the other to one end of the bell crank 182, yieldingly to resist movement of the latter by the cam 170, as will be apparent. A block 186 is provided with a shoulder 186a slidably in the groove 184a (Figs. 2, 6) and carries a threaded bolt 187 the head of which rides in the T-shaped groove 184b. The free threaded end of the bolt 187 projects through the block 186 and is engaged by a nut 189 having the handle 190 projecting therefrom. Intermediate the nut 189 and block 186 is provided a finger 191 threadedly engaged by one end of the rod 165 and apertured to fit loosely on the bolt 187. By varying the position of the block 186 with respect to the pivotal stud 183, the amplitude of reciprocating movement of rod 165 may be varied as desired and corresponding variations effected in the rocking movement of the arm 154 with corresponding variation in the amplitude of reciprocation of the sleeve 137 and chuck 140.

A second cam 200 is mounted upon the shaft 172 (Figs. 2, 5, 8) and with it co-acts the follower 201 carried by the arm 202 secured to a shaft 204. The shaft is provided with an extending finger or lug 204a, which overlies the shoulder 125b of plate 125. It will be apparent that under actuation by cam 200, the shaft 204 will be oscillated and the finger 204a will bear down upon the lug or flange 125b to rock the work head 110 about its pivots and against the resistance of the springs 130, 131. This movement causes a movement of the chuck and work-piece toward or into the grinding wheel 97 as will be apparent.

It will be noted that the cam 200 is provided with arcuate slots 200a through which project threaded bolts 210 which threadedly engage a shoulder 170a on the adjacent cam 170. These bolts and slots permit relative rotative adjustment of cam 200 with respect to cam 170 and when tightened, secure these cams in adjusted relation. This permits a change in the timing to conform to changed conditions to be met in the grinding of a drill or blank. In other words, the reciprocating movement of the work head may be adjustably timed in desired synchronism with the rocking movement of such head.

Associated with the shaft 172 is a magnetic clutch mechanism generally indicated by the numeral 212 (Fig. 10), comprising a cylindrical casing, in one portion 213 thereof chambered to receive one end of the shaft 172 which is provided with an enlarged disc portion 172c. On either side of this disc is provided a clutch ring 215, these plates being loosely mounted in the casing and secured against rotation other than with the casing by pins 216 extending through rings 215 and into the wall of the casing portion 213. Inserts of suitable material such as cork, asbestos, brake lining or the like, are designated by numeral 217 and carried on the opposed inner faces of the ring 215 in contact with or in proximity to the faces of the disc 172c. Threaded stops 218 are carried in the inner face of the casing portion 213 to limit the axial movement in one direction of the adjacent ring 215.

The clutch casing also comprises a second chambered portion 219 having an apertured end wall 219a shouldered adjacent its outer periphery to afford a seat for the casing portion 213 (Fig. 10). To the opposite end of the casing portion 219 is secured end flange 220 of the shaft 221, such securement being by means of cap screws 222 or the like. The flanged end of the shaft 221 is centrally recessed at 221a and provided with a bearing sleeve 224 therein, in which is loosely fitted a stub-shaft 226 which is chambered at one end to receive the coil spring 227 bearing against the end of the recess in the shaft 221 to urge such stub-shaft outwardly therefrom. At its outer end, the stub-shaft is enlarged and provided with a flange 228 and a pair of spaced flanges 229 which provide a groove 230. In this groove is mounted the free end of each of a plurality of fingers 231, such fingers being pivoted at 231 intermediate their extremities upon pins carried by spaced lugs 233 projecting from the outer face of the flange 219a of clutch casing portion 219. It will be apparent that movement of the stub shaft 226 against the action of the spring 227, i. e., to the left as viewed in Fig. 10, will result in a rocking or a partial rotation of the fingers 231. These fingers bearing against the outer face of one of the rings 215 serve to move the two rings toward each other relatively and to cause frictional engagement of the portions 217 of the disc with the flange 172c and rotation of the clutch casing 212 and shaft 221 will be transmitted to the shaft 172.

The pins 216 are extended into suitable apertures in the end wall 219a of casing portion 219. Threaded screws 235 serve to secure the two casing portions 213, 219 together in assembled relation.

To effect this clutching action just described, I provide electro-magnetic coils 238 in the casing portion 219 and with them are associated magnetic cores 240 projection beyond the coils 238 into proximity with an armature disc 242 which is slidably mounted upon the heads of studs 243 carried by pins 245 projecting from the face of the shaft flange or hub 220. Intermediate the magnetic cores 238 and the armatures 242 is a sheet of insulating material 246. The armature 242 is secured to the stub shaft 226 by a nut 226a.

It will be apparent that when current is supplied to the magnetic coils 238 magnetism will be generated in the cores 240 with the consequent attraction of the armature 242 which is mounted for sufficient movement to move the stub shaft 226 into clutching position.

Mounted upon the shaft 221 exteriorly of the clutch casing are a pair of slip or commutator rings 250 separated by an insulating disc 251 and mounted in shouldered insulating collars 252, 253 (Fig. 10). Leads 254, 255 extend through the insulating collar 252, one to each of the commutator rings 250, the lead 254 being insulated from one ring as illustrated in Fig. 10. These leads are suitably connected to the series of coils 238 for excitation thereof by the passage of current therethrough. Brushes 260 connected with suitable current wires ride upon the commutator rings 250 and are in circuit with a source of current (Fig. 2).

Figure 26:
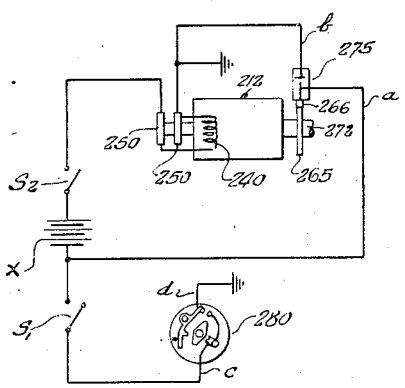
Fig. 26 is a diagrammatic view of the wiring, timer, magnetic clutch, etc.

Mounted upon and secured to the shaft 172 in proximity to the cams 170, 200 is a cam disc 265 (Figs. 2, 9). The outer periphery of this disc 265 is provided with spaced depressions 265a shown as arcuate in contour. The follower, comprising a roller 266, rides upon the periphery of the disc 265 which is mounted in a bracket 268, a second roller 269 being carried at the lower end of the bracket 268 and seatable in the notch 269a of a block 269b mounted upon the carriage 72. The bracket 268 is reciprocable or oscillatable in a recess 270a in a supporting bracket 270 (Fig. 5) and the roller 266 is urged into constant contact with the cam disc 265 by a spring urged pin 272 carried in the bracket 270 which is in turn secured by the bolts 273 to the carriage 72. Also carried by the bracket 270 is a switch casing 275 to which lead a pair of current wires a, b, (Figs. 2, 26). A switch of any desired type is located in the casing 275 and is provided with a protruding spring-urged plunger 275a. When the follower or roller 266 is riding on the periphery of the cam 265 out of any depression 265a, the bracket 268 will move the switch plunger 275a and close the circuit through the wires a, b. However, when the roller rides into depression 265a, the bracket 268 will be urged into the position illustrated in Figs. 2 and 9 at which time the plunger is moved out of circuit-closing position.

Associated with the magnetic clutch in the operation of the mechanism described is a timer mechanism generally indicated by numeral 280 (Figs. 2, 11, 12). This comprises the casing 281 open at one end, and provided with a recess at such end to accommodate the outer edge of the disc 282. The outer face of the casing 281 is provided with a hub portion 281a apertured and provided with a tubular insulating sleeve 283 through which protrudes a conductor pin 284 having a head 284a and yieldingly urged by the coil spring 285 into contact with a conductor rod 286. On the enclosed face of the disc 282 is secured an insulating block 288 which in turn carries a spring contact 289 normally in contact with the inner end of the pin 284. The breaker arm 290 is pivotally mounted on the pin 291 projecting from the face of the disc 282 and intermediate its extremities. One end of the breaker arm 290 is extended to overlie an adjustable stop 294 also carried by the inner face of the disc 282. An insulating piece 295 is carried by the breaker 290. The spring 296 bears upon the breaker arm as indicated in Fig. 12 and normally maintains the same at its end bearing against the stop 294. At its opposite end, breaker 290 is provided with an adjustable screw contact 298 overlying and normally spaced from a yielding contact 300 journalled in the spaced arms 302a of a bracket 302 secured to the inner face of the disc 282. This contact 300 is provided with a collar 303 secured thereto beneath one of the bracket arms 302a and is held thereagainst by a coil spring 304 mounted between the two bracket arms. This arrangement permits the contact pin 300 to yield when necessary against the action of the spring 304. A shaft 306, having an enlarged shoulder 306a, is provided and the shoulder 306a is journalled in a bearing member 307 carried in a suitable recess at the center of the hub 282a of disc 282. Outwardly of the shoulder portion 306a, the shaft 306 is provided with a reduced end 306b projecting into the casing 281 where it carries a breaker cam 310 secured to it and spaced from the bearing by a washer 311. This cam 310 co-acts with the contact piece 295 at timed intervals during its rotation to oscillate the breaker arm 290 to bring the contacts 298, 300 to a meeting. Leads c and d extend from the contact 289 through the contact pin 300 and from the contact 298 respectively (see Figs. 12, 26). The cam 310 is provided in the embodiment shown, with two opposed lobes 310a which at 180 degree intervals effect this closing of the circuit through the timer.

The lead d is grounded through the mechanism into circuit with one of the commutator rings 252 (Fig. 26). Spaced plates 315 project upwardly from the front of the carriage 72 and are apertured to house bearing members 316 (Fig. 11), in which are journalled shouldered portions 320a of the tubular shaft 320 through which extends the shaft 306 loosely journalled therein. One end of the shaft 320 is enlarged to provide a chamber in which are mounted bearing members 322 which provide bearing support for an extended sleeve portion 324a and a clutch disc 324. This disc 324 is rotatably mounted within the cylindrical wall 325a of the knob 325 which is secured as by the set screw 326 to one end of the inner shaft 306. Spring urged clutching pins 327 are housed in suitable radial apertures in the disc 324 and are urged against the inner wall of the flange 325a in frictional contact therewith. Mounted upon a second tubular extension 324b surrounding and spaced from a sleeve-portion 324a, is the gear 90 in mesh with gear 89 (Figs. 2, 11). It will be apparent that, normally, rotation of the gear 90 will be transmitted through the clutch disc 324 and the knob 325 to the shaft 306 to rotate the breaker cam 310. The disc 282 is provided with an extended hub 282a threadedly secured to an extended shoulder portion 320a of the tubular shaft 320 so that any rotative movement of shaft 320 will be transmitted to the timer disc 282, carrying the breaker arm and contacts. The knob 325 may be rotated by hand due to the frictional engagement of the clutch disc 324, relatively to move i. e., advance or retard, the action of the breaker cam 310 with consequent effect upon the opening and closing of the circuit through the leads c, d. On the other hand, rotative movement of the tubular shaft 320 will angularly displace the breaker arm with a consequent advance or retardation of the closing of the same leads. The purpose of these adjustments will be made clear below.

It may be stated here that the primary purpose for providing means for adjustment of the timer casing and disc 282 relative to the shaft 306 and breaker cam 310 is to compensate for the helical twist or lead of the grooves and flutes on a twist drill, as such drill is moved longitudinally past the grinding wheel 97.

The exterior of the tubular shaft 320 between its shouldered portions 320 is provided with helical teeth 320c (Fig. 2) which are arranged to mesh with the teeth of a vertically mounted rack 330 mounted upon the vertically reciprocable plate 331 mounted between the bearing members 333 which is turn are carried upon a plate 335 secured to the brackets 315. The plate 335 is thus secured to the carriage 72 for longitudinal movement therewith.

Beneath the carriage 72, the rack plate 331 is provided with a roller 331a. On the front of the base 50 is mounted the semi-cylindrical cam plate 340 pivotally adjustable about the shaft 341 and provided with an arcuate slot 340a in which rides a friction block 343 carried by the base 50. From one end of the cam plate 340 projects the handle 340b. If convenient the outer curved portion of the plate 340 may be provided with index markings 340c arranged in proximity to marks on a master block 345 also projecting from the front of the base 50. The upper edge of the plate 340d is of straight line construction, in the embodiment illustrated, and underlies the roller 331a.

The weight of the rack 330 on plate 331 is sufficient to maintain the roller 331a in contact with the edge 340d during longitudinal movement of the table 72 and it will be apparent that the cam plate 340 may be adjustably rotated to vary the rate of rise and fall of the rack 330 for any uniform longitudinal movement of the carriage 72, or may be set in horizontal position so that there will be no rise and fall of the rack and no advance or retardation of the timer mechanism, as for grinding work pieces having straight flutes instead of helical grooves and flutes.

It will be apparent that the timer shaft 306 and chuck 140 are driven from a common shaft 84 and, therefore, rotate in synchronism i. e., at the same angular rate, if the gearing be properly selected.

The cams 170 and 200 are so constructed and arranged that the work head and work piece will be rocked and reciprocated in synchronized relation. This synchronized relation is such that the step or shoulder of a step drill will be ground with a relief from the cutting edge to the drilling edge, the amount of that relief being determined by the amount of reciprocation of the work head during the grinding portion of its cycle. Likewise, the rocking of the work head is so timed that the work piece will be at a point most remote in its rocking movement from the center of the grinding wheel as it encounters the cutting edge and the land of each flute of the drill and at the proper point will be moved further toward and into the grinder wheel to effect the desired relief cutting between the rear edge of the land and the trailing edge of the flute.

By adjustment of the timing means through knob 325, the timing of the grinding operation may be varied as indicated in Fig. 24 where the near-radial broken lines indicate various points at which the work piece may be moved to a position laterally most remote from the axis of the grinding wheel 97. In short, a change in the timing mechanism may be effected as desired to obtain lands of any desired width and to effect relief grinding, if so desired, from the cutting edge of the flute without formation of lands.

The reciprocating movement of the head is desirable also during the grinding of the lands and relief of the flutes as it eliminates any grooving or irregularity in such grinding during the longitudinal feed of the work piece past the grinder.

With the automatic compensating rotation of the tubular shaft 320, as described above, the timing of the actuating cams 170, 200 is automatically changed to initiate and terminate the grinding cuts on the work piece thereby to compensate for the helical twist or lead of the flutes of such work piece.

In Fig. 26 I have illustrated diagrammatically a wiring diagram which is suitable to effect the operation of my machine in which two parallel circuits are illustrated, the one including leads or wires c, d and the other, the leads or wires a, b, indicating a source of current or power. It will be apparent, from this diagram, that either circuit is adapted to excite the magnet 240 of the clutch in which case rotation of the cam shaft will ensue, unless either or both of the switches S1, S2 is open.

In the operation of the mechanism described, as stated, the circuit controlled by the timing mechanism is electrically connected to the magnets of the clutch so that their excitation by this circuit will occur, due to the normal separation of the contacts 298, 300 (Fig. 12), only as the lobes 310a of the breaker cam 310 make the circuit at the contacts 298, 300, of the breaker cam.

The follower 266 when riding on the high surfaces of cam 265 will maintain the circuit closed through the switch in casing 275 and provide for energization of the clutch magnets thereby for rotation of the cam shaft 172 during those portions of the travel of the timer cam 310 where it is out of contact with the breaker and piece 295. However, as the follower 266 rides into a depression 265a the switch in casing 275 (which I term the "carry-over switch") is opened and for a brief period of time the magnetic clutch releases the cam shaft 172 and it is brought sharply to rest until the breaker cam 310 temporarily closes the contacts 298, 300 which again operate to energize the magnetic clutch for a sufficient period of time to rotate the cam 265 to bring its follower up on the high, switch-closing surface of the cam.

The arrangement and operation of the timer and "carry-over" switch cam is such that if the grinding of a work piece is interrupted and rotation of the chuck and work piece follows as by hand, when the magnetic clutch is not in clutching position, restart of the grinding will result, automatically, in the proper synchronism and coordination of the rocking and reciprocating cams. The same is true when a new work piece is properly positioned in the chuck for grinding. In other words, the cam shaft is always brought to rest with the follower roller 266 in one of the depressions 265a. Regardless of the position of the breaker cam 310, when work is again started, the cam shaft 172 will not start rotation with the cams until the breaker again closes the circuit through the magnetic clutch to initiate rotation of the cam shaft and that will be properly timed with the position of the work piece since the latter is geared to and synchronized with the driving means for the breaker cam, as explained above.

Bearing in mind that the rotation of the work piece is in unison or synchronism with the rotation of the breaker cam 310, proper positioning of the two cams 170, 200 on the cam shaft 172 permit a portion or all of the groove of the work piece to rotate past the grinder wheel 97 during the temporary dwell or inaction of the cam shaft.

Also, it is to be noted that where lands are to be ground upon flutes at their leading edges, it is essential that the work head 110, with the work piece, be in position farthest removed from the grinding wheel but thereafter the cam 200 actuates its follower 201 and the rock shaft 204 to effect the relief grinding of the remainder of the flute surface which entails a proper coordination of the cam 200 with the actuation, through the magnetic clutch, of the cam shaft 172.

The two-lobe breaker cam 310 is utilized for the grinding of a two-flute drill and the rate of rotation imparted to the work piece and timer cam is also selected for the grinding of such a drill. In the embodiment illustrated, however, each of the cams 170 and 210 is provided with three lobes (although the number may be varied if the proper rate of rotation be correspondingly varied), each lobe relating to the relief grinding of one flute or the shoulder thereof on a two fluted drill. The cams 170 and 210 will rotate 120 degrees while the timer shaft 306 rotates 180 degrees so that the latter, in the form shown, will be rotated three complete revolutions for two complete revolutions of the cam shaft 172. In other words, with each half revolution of the timer shaft 306 there will be effected a full reciprocation of the chuck and a full rocking movement and return of the work head, In order that the carry-over switch follower 266 may properly come to rest in each depression 265a of cam 265, it is desirable to make provision for a slight dwell or interruption of the rotation of the cam shaft. In other words, the shaft 221 which is continuously rotating will overrun or travel a small amount before the magnetic clutch 212 is again actuated by the timer 280 to regrip or clutch the cam shaft 172. Otherwise, as pointed out, unless the clutch 68 has been released the timer shaft 306, shaft 84, and chuck 140 are constantly driven so that the synchronized relation between the clutch casing 213—219, the timer, and the chuck carrying the work piece is maintained.

For the relief grinding of the shoulder or step of the drill from its leading edge to its trailing edge, it is necessary to advance the work piece longitudinally of the grinder (under actuation of the spring 185) during the period of time while the shoulder is being ground and thereafter to retract it as the following groove of the drill is traversing the grinder, this, preliminary to grinding the next or succeeding shoulder. This entails the proper timing of the reciprocating movement of the work head 110 by the cam 170 so that its follower 266 will pivot the plate portion of the rocker arm 182 to thrust the rod 165 in the direction of the arrow in Fig. 4 to permit the spring urged pins 145 to advance the work head to the right as viewed in Fig. 1 to effect relief grinding of the shoulder of one flute and thereafter to return the work head by a pull upon the rod 165 against the resistance of the pins 145 while the succeeding groove of the drill is passing the grinder. This will again position the work piece ready for the relief grinding of the shoulder of the second flute.

In Figs. 16 and 17 I have illustrated a stepped drill ground upon the machine of this invention in which 10 designates a flute of a twist drill at the leading edge of which there has been ground or left unground, a raised land 11. From the rear of the land 11 to the trailing edge of the flute 10 the surface has been ground to provide a relief portion 12 to reduce or eliminate binding of the drill during a cutting operation thereby. Likewise, the shoulder 13 has been ground from its leading edge 14 to its trailing edge 15 to provide a relief for the cutting edge of the shoulder in grinding operations. In Fig. 21 I have illustrated a drill in relation to the grinding wheel 97 just after formation of a land 11 and prior to the grinding of the relief after said land. Fig. 22 is a view similar to Fig. 21 showing the relation of the drill and grinding wheel at the completion of the relief grinding of a flute.

In Fig. 23 I have illustrated in said elevation the position of a drill with respect to the grinding wheel 97 at the completion of the relief grinding of a shoulder as described above.

It will be noted that I have filleted the juncture of the shoulders and the reduced drill portions as indicated at 16 (Figs. 16, 18, 23). This is done by proper shaping of the grinding wheel 97 and prevents the formation of burrs at the merger of a reduced drilled hole with a hole of larger diameter as illustrated in Fig. 18, thereby obviating the weakening of the shoulder edge and the necessity for an additional finishing operation.

In some cases, I find it desirable to undercut the surface of the shoulder as illustrated at 17 in Fig. 19 by a separate operation to enable the user of the drill to drill a hole of the character illustrated in Fig. 20 where the shoulder between the two drill holes is provided with a relatively raised portion 18 (Fig. 20) which is of value in that it greatly facilitates accurate depth gauging of the drilled holes.

It will be apparent that in the use of my machine, after proper setting of the work piece in the chuck to conform to the timed actions of the chuck and work head described above, the work piece may be moved laterally into proper relation to the grinding wheel and after an initial shoulder forming cut is made, the drill may be moved automatically or manually, longitudinally with respect to the grinder, during which movement it will be reciprocated and rocked or oscillated relative to the grinding wheel and in properly timed cycles so as to obtain the desired lands and reliefs and, in the case of helically fluted drills and the like, the timing will be advanced or retarded to compensate for the helical twist or lead of the flutes and grooves.

My invention is susceptible to modification and variation and I do not wish to be restricted to the specific embodiment illustrated and described except as the appendant claims, properly construed with respect to the prior art, compel such restrictions.

I claim:

1. In mechanism of the class described, a base, a head mounted thereon for rocking movement and provided with an engageable portion, a rock shaft having means engageable with said portion to rock said head, means to rock said shaft including a rocker arm carried thereby, a rotating shaft, a cam carried by said shaft, a follower carried by said rocker arm and contactable with said cam, means intermittently to rotate said cam shaft, comprising a drive shaft and an automatic clutching means interposed between said drive and cam shafts.

2. In mechanism of the class described, a base, a head mounted thereon for rocking movement and provided with an engageable portion, a rock shaft having means engageable with said portion to rock said head, means to rock said shaft including a rocker arm carried thereby, a rotating shaft, a cam carried by said shaft, a follower carried by said rocker arm and contactable with said cam, means intermittently to rotate said cam shaft, comprising a drive shaft and an automatic clutching means interposed between said drive and cam shafts, and timing means operable intermittently to actuate said clutching means.

3. In mechanism of the class described, a base, a head mounted thereon for rocking movement and provided with an engageable portion, a rock shaft having means engageable with said portion to rock said head, means to rock said shaft including a rocker arm carried thereby, a rotating shaft, a cam carried by said shaft, a follower carried by said rocker arm and contactable with said cam, means intermittently to rotate said cam shaft, comprising a drive shaft and an automatic clutching means interposed between said drive and cam shafts, timing means operable intermittently to actuate said clutching means, a chuck for receiving and engaging the work piece, said chuck being rotatably mounted in said work head, means to rotate said chuck, said chuck rotating means and said timing means being constructed and arranged to operate in synchronism.

4. In mechanism of the class described, a base, a grinding member carried thereby, a work head rockably mounted upon said base, a chuck for carrying a work piece rotatably mounted in said head, means to rotate said chuck, means to rock said work head including an engageable member carried by said work head, a rock shaft, means carried thereby to engage said engageable member to impart rocking movement to said work head, means including a cam to rock said shaft, a shaft carrying said cam, means to rotate said last named shaft including a drive shaft and a clutch interposed therebetween and said cam shaft, timing means automatically to actuate and release said clutch, and means to actuate said timing means in synchronism with the rotation of said chuck.

5. In mechanism of the class described, a base, a work head rockably mounted upon said base, a chuck rotatably mounted in said work head, means to rock said work head including a rock shaft engageable with said work head, means to rock said shaft including a rocker arm and a cam coacting therewith, a shaft carrying said cam, a drive-shaft, clutching means operatively interposed between said drive-shaft and said cam-shaft, and including clutch members, magnetic actuating means therefor, including a magnet and armature, a circuit including said magnet, a timer also included in said circuit and comprising normally spaced contacts in said circuit and a breaker arm actuatable to close said contacts, a cam coacting with said arm to effect closure of said contacts intermittently, and a drive-shaft carrying said last named cam, means to rotate the same to effect excitation of said magnet and clutching of said first named drive shaft to said first named cam-shaft intermittently, means including a shaft and gears for rotation of said chuck, said last named shaft being operatively connected to said timer cam-shaft whereby the rotation of said chuck will be in synchronism with the operation of said timer and the actuation thereby of said clutch.

6. In mechanism of the class described, a base, a work head rockably mounted upon said base, a chuck rotatably mounted in said work head, means to rock said work head including a rock shaft engageable with said work head, means to rock said shaft including a rocker arm and a cam coacting therewith, a shaft carrying said cam, a drive-shaft, clutching means operatively interposed between said drive-shaft and said cam-shaft, and including clutch members, magnetic actuating means therefor, including a magnet and armature, a circuit including said magnet, a timer also included in said circuit and comprising normally spaced contacts in said circuit and a breaker arm actuatable to close said contacts, a cam coacting with said arm to effect closure of said contacts intermittently, and a drive-shaft carrying said last named cam, means to rotate the same to effect excitation of said magnet and clutching of said first named drive shaft to said first named cam-shaft intermittently, means including a shaft and gears for rotation of said chuck, said last named shaft being operatively connected to said timer cam-shaft whereby the rotation of said chuck will be in synchronism with the operation of said timer and the actuation thereby of said clutch, said shaft and gears for rotation of said chuck being operatively connected to said first named drive shaft whereby the same is driven in synchronism with the said timer cam shaft and chuck.

7. In mechanism of the class described, a base, a work head rockably mounted upon said base, a chuck rotatably mounted in said work head, means to rock said work head including a rock shaft engageable with said work head, means to rock said shaft including a rocker arm and a cam coacting therewith, a shaft carrying said cam, a drive-shaft, clutching means operatively interposed between said drive-shaft and said camshaft, and including clutch members, magnetic actuating means therefor, including a magnet and armature, a circuit including said magnet, a timer also included in said circuit and comprising normally spaced contacts in said circuit and a breaker arm actuatable to close said contacts, a cam coacting with said arm to effect closure of said contacts intermittently, and a drive-shaft carrying said last named cam, means to rotate the same to effect excitation of said magnet and clutching of said first named drive shaft to said first named cam-shaft intermittently, means including a shaft and gears for rotation of said chuck, said last named shaft being operatively connected to said timer cam-shaft whereby the rotation of said chuck will be in synchronism with the operation of said timer and the actuation thereby of said clutch, said shaft and gears for rotation of said chuck being operatively connected to said first named drive shaft whereby the same is driven in synchronism with the said timer cam shaft and chuck, said last named operative connection being constructed and arranged to rotate said first named drive shaft at least slightly when said cam shaft is declutched therefrom.

8. In mechanism of the class described, a base, a work head rockably mounted upon said base, a chuck rotatably mounted in said work head, means to rock said work head including a rock shaft engageable with said work head, means to rock said shaft including a rocker arm and a cam coacting therewith, a shaft carrying said cam, a drive shaft, clutching means operatively interposed between said drive shaft and said cam shaft, and including clutch members, magnetic actuating means therefor, including a magnet and armature, a circuit including said magnet, a timer also included in said circuit and comprising normally spaced contacts in said circuit, a breaker arm actuatable to close said contacts, a cam coacting with said arm to effect closure of said contacts intermittently, a drive shaft carrying said last named cam, means to rotate the same to effect excitation of said magnet and clutching of said first named drive shaft to said first named cam shaft intermittently, means including a shaft and gears for rotation of said chuck, said last named shaft being operatively connected to said timer cam shaft whereby the rotation of said chuck will be in synchronism with the operation of said timer and the actuation thereby of said clutch, a second circuit including said magnet, and means intermittently to make and break said second circuit, said last named means being constructed and arranged to close said second circuit through said magnet when said first circuit is broken.

9. In mechanism of the class described, a base, a work head rotatably mounted upon said base, a chuck rotatably mounted in said work head, means to rock said work head including a rock shaft engageable with said work head, means to rock said shaft including a rocker arm and a cam coacting therewith, a shaft carrying said cam, a drive shaft, clutching means operatively interposed between said drive shaft and said cam shaft, and including clutch members, magnetic actuating means therefor, including a magnet and armature, a circuit including said magnet, a timer also included in said circuit and comprising normally spaced contacts in said circuit, a breaker arm actuatable to close said contacts, a cam coacting with said arm to effect closure of said contacts intermittently, a drive shaft carrying said last named cam, means to rotate the same to effect excitation of said magnet and clutching of said first named drive shaft to said first named cam shaft intermittently, means including a shaft and gears for rotation of said chuck, said last named shaft being operatively connected to said timer cam shaft whereby the rotation of said chuck will be in synchronism with the operation of said timer and the actuation thereby of said clutch, a second circuit including said magnet, and means intermittently to make and break said second circuit, said last named means being constructed and arranged to close said second circuit through said magnet when said first circuit is broken, and comprising a cam carried by said first named cam shaft and a switch member actuatable by said cam to open and close said second circuit at predetermined intervals.

10. In mechanism of the class described, a base, a work head rockably mounted upon said base, a chuck rotatably mounted in said work head, means to rock said work head including a rock shaft engageable with said work head, means to rock said shaft including a rocker arm and a cam coacting therewith, a shaft carrying said cam, a drive shaft, clutching means operatively interposed between said drive shaft and said cam shaft, and including clutch members, magnetic actuating means therefor, including a magnet and armature, a circuit including said magnet, commutator rings carried by said drive shaft and included in said circuit, a timer also included in said circuit and comprising normally spaced contacts in said circuit, a breaker arm actuatable to close said contacts, a cam coacting with said arm to effect closure of said contacts intermittently, a drive shaft carrying said last named cam, means to rotate the same to effect excitation of said magnet and clutching of said first named drive shaft to said first named cam shaft intermittently, means including a shaft and gears for rotation of said chuck, said last named shaft being operatively connected to said timer cam shaft whereby the rotation of said chuck will be in synchronism with the operation of said timer and the actuation thereby of said clutch, a second circuit including said magnet, and means intermittently to make and break said circuit, said last named means being constructed and arranged to close said second circuit through said magnet when said first circuit is broken.

11. In mechanism of the class described, a work head, a chuck carried thereby, means to rotate said chuck and means to reciprocate said chuck comprising a rocker arm, a cam, a follower actuatable by said cam, and connecting means between said follower and rocker arm, said last named means comprising a pivotally mounted bell crank operatively connected to said follower and a connecting rod extending between and operatively connected to said bell crank and said rocker arm.

12. In mechanism of the class described, a work head, a chuck carried thereby, means to rotate said chuck and means to reciprocate said chuck comprising a rocker arm, a cam, a follower actuatable by said cam, and connecting means between said follower and rocker arm, said last named means comprising a pivotally mounted bell crank operatively connected to said follower and a connecting rod extending between and operatively connected to said bell crank and said rocker arm, and means to vary the connection of said rod to said bell crank to vary the amplitude of movement of said rocker arm.

13. In mechanism of the class described, a work head, a chuck carried thereby, means to rotate said chuck and means to reciprocate said chuck comprising a rocker arm, a cam, a follower actuatable by said cam, and connecting means between said follower and rocker arm, said last named means comprising a pivotally mounted bell crank operatively connected to said follower and a connecting rod extending between and operatively connected to said bell crank and said rocker arm, and means to vary the connection of said rod to said bell crank to vary the amplitude of movement of said rocker arm, a shaft carrying said cam and means to rotate such shaft, including a drive shaft and a clutch to connect said shafts in driving relation and means for intermittently releasing said clutch to discontinue driving of said cam shaft, said last named means comprising a magnet and armature, clutch actuating means associated with said armature, an electric circuit including said magnet, and timing means intermittently to open and close said circuit.

14. In mechanism of the class described, a work head, means rockably to support said head, a chuck rotatably and reciprocably mounted therein, means to rock said work head including a cam and cam actuated mechanism, means to reciprocate said chuck comprising a second cam and cam actuated means, said cams being carried by a rotatable shaft, means to rotate said cam shaft including a drive shaft and a clutch interposed between said drive shaft and said cam shaft, a common drive means for said drive shaft and said chuck, timing means intermittently to actuate and release said clutch in synchronism with the rotation of said chuck, said timing means being actuated by said common drive means.

15. In mechanism of the class described, a work head, means rockably to support said head, a chuck rotatably and reciprocably mounted therein, means to rock said work head including a cam and cam actuated mechanism, means to reciprocate said chuck comprising a second cam and cam actuated means, said cams being carried by a rotatable shaft, means to rotate said cam shaft including a drive shaft and a clutch interposed between said drive shaft and said cam shaft, a common drive means for said drive shaft and said chuck, timing means intermittently to actuate and release said clutch in synchronism with the rotation of said chuck, said timing means being actuated by said common drive means, and means automatically to vary the timing of said timing means.

16. In mechanism of the class described, a work carrying head mounted for rocking movement, supporting means therefor, a rotatable work carrier carried by said head, means continuously to rotate said carrier, a grinding means, means to reciprocate said head relative to said grinding means, means to rock said head comprising a shaft, co-acting means carried by said head, said shaft being provided with means intermittently to actuate said co-acting means to rock said head, a rotatable cam, means to rotatably support said cam and means to rotate said cam, and means operatively interposed between said cam and shaft and actuatable by said cam to rock said shaft and thereby actuate said co-acting means to rock said head.

17. In mechanism of the class described, a work carrying head mounted for rocking movement, supporting means therefor, a rotatable work carrier carried by said head, means continuously to rotate said carrier, a grinding means, means to reciprocate said head relative to said grinding means, means to rock said head comprising a shaft, co-acting means carried by said head, said shaft being provided with means intermittently to actuate said co-acting means to rock said head, a rotatable cam, means to rotatably support said cam and means to rotate said cam, means operatively interposed between said cam and shaft and actuatable by said cam to rock said shaft and thereby actuate said co-acting means to rock said head, and a spring member to resist rocking movement of said head from normal or rest position.

WALTER UMBDENSTOCK.

REFERENCES CITED

The following references are of record in the file of this patent:

UNITED STATES PATENTS

| Number | Name | Date |
|---|---|---|
| Re. 20,491 | Weishampel | Aug. 31, 1937 |
| 805,170 | Thomas | Nov. 21, 1905 |
| 1,198,613 | Bright | Sept. 19, 1916 |
| 1,323,452 | Cogsdill | Dec. 2, 1919 |
| 1,640,994 | Hanson | Aug. 30, 1927 |
| 2,099,724 | Cogsdill | Nov. 23, 1937 |
| 2,193,186 | Bannister | Mar. 12, 1940 |